US012393007B2

(12) United States Patent
Weippert et al.

(10) Patent No.: US 12,393,007 B2
(45) Date of Patent: Aug. 19, 2025

(54) METHOD FOR ADAPTING OPTICAL PROPERTIES OF AN IMMERSION MIXTURE, AND IMMERSION MIXTURES AND COMPONENTS THEREOF

(71) Applicant: Carl Zeiss Microscopy GmbH, Jena (DE)

(72) Inventors: Hans-Joachim Weippert, Aalen (DE); Matthias Krieg, Heidenheim (DE)

(73) Assignee: Carl Zeiss Microscopy GmbH, Jena (DE)

( * ) Notice: Subject to any disclaimer, the term of this patent is extended or adjusted under 35 U.S.C. 154(b) by 1094 days.

(21) Appl. No.: 17/250,656

(22) PCT Filed: Aug. 13, 2019

(86) PCT No.: PCT/EP2019/071655
§ 371 (c)(1),
(2) Date: Feb. 16, 2021

(87) PCT Pub. No.: WO2020/038767
PCT Pub. Date: Feb. 27, 2020

(65) Prior Publication Data
US 2021/0318531 A1 Oct. 14, 2021

(30) Foreign Application Priority Data
Aug. 21, 2018 (DE) ...................... 10 2018 214 054.5

(51) Int. Cl.
G02B 21/33 (2006.01)
C09K 23/00 (2022.01)
G01N 1/30 (2006.01)

(52) U.S. Cl.
CPC ............ *G02B 21/33* (2013.01); *C09K 23/007* (2022.01); *G01N 1/30* (2013.01)

(58) Field of Classification Search
CPC ........................................ G02B 21/33
See application file for complete search history.

(56) References Cited

U.S. PATENT DOCUMENTS

| 4,789,490 | A | 12/1988 | Tanaka |
| 5,817,256 | A | 10/1998 | Weippert |
| 6,221,281 | B1 | 4/2001 | Motoyama |
| 6,844,206 | B1 | 1/2005 | Phan et al. |
| 7,285,231 | B2 | 10/2007 | Weippert |
| 9,964,751 | B2 | 5/2018 | Weippert |
| 2002/0111518 | A1 | 8/2002 | Wang et al. |
| 2004/0213750 | A1* | 10/2004 | Bennett .................. A01N 31/02 514/724 |
| 2004/0220070 | A1 | 11/2004 | Weippert |
| 2010/0212548 | A1 | 8/2010 | Wieppert |
| 2013/0286092 | A1* | 10/2013 | Sambhy ................. B41J 2/1606 427/322 |
| 2014/0272111 | A1* | 9/2014 | Bradford ................. C09D 5/024 524/378 |
| 2014/0355109 | A1 | 12/2014 | Weippert |
| 2018/0321480 | A1 | 11/2018 | Ohrt et al. |

FOREIGN PATENT DOCUMENTS

| DE | 677 870 | 7/1939 |
| DE | 197 05 978 | 9/1997 |
| DE | 103 08 610 | 9/2004 |
| DE | 10 2009 010 504 | 9/2010 |
| DE | 10 2012 014 091 | 1/2013 |
| DE | 10 2013 210 113 | 12/2014 |
| DE | 10 2015 221 044 | 5/2017 |
| EP | 0 209 621 | 5/1990 |
| JP | 2008-137973 | 6/2008 |

OTHER PUBLICATIONS

German Search Report issued Nov. 21, 2018 in German Application No. 10 2018 214 054.5.
German Search Report issued Mar. 22, 2019 in German Application No. 10 2018 008 967.4.
International Search Report issued Mar. 5, 2020 in PCT/EP2019/071655 with English translation, 8 pages.
Written Opinion issued Mar. 5, 2020 in PCT/EP2019/071655 with English translation, 17 pages.
Langhals, H. "Der Zusammenhang zwischen dem Brechungsindex und der Zusammensetzung binärer Flüssigkeitsgemische," Z. Phys. Chem. 1985, 266, 775-780 (with English language abstract on p. 12).
German Search Report issued Nov. 21, 2018 in German Application No. 10 2018 214 054.5 (with expanded Statement of Relevancy).

* cited by examiner

Primary Examiner — Peter F Godenschwager
(74) Attorney, Agent, or Firm — Grüneberg and Myers PLLC

(57) ABSTRACT

A method adapts optical properties of an immersion mixture by providing an immersion mixture made of multiple components, wherein at least two of the components have different optical properties and the immersion mixture has optical properties resulting from the proportions of the components, determining current actual values of the optical properties of the immersion mixture, and comparing the current actual values with target values. If actual values differ from target values by an unacceptable amount, a target mixture ratio of the components is determined to achieve the target values and the proportion of the components is set according to the target mixture ratio. For the components, water can be selected with a water-soluble inorganic compound or a water-soluble organic compound, or a non-water-soluble compound can be selected with a solvent suitable for dissolving the compound. Suitable chemical compounds and an immersion mixture made of multiple components can also be utilized.

20 Claims, No Drawings

METHOD FOR ADAPTING OPTICAL PROPERTIES OF AN IMMERSION MIXTURE, AND IMMERSION MIXTURES AND COMPONENTS THEREOF

CROSS-REFERENCE TO RELATED APPLICATIONS

This application is the National Stage entry under §371 of International Application No. PCT/EP2019/071655, filed on Aug. 13, 2019, and which claims the benefit of German Application No. 10 2018 214 054.5, filed on Aug. 21, 2018. The content of each of these applications is hereby incorporated by reference in its entirety.

BACKGROUND OF THE INVENTION

Field of the Invention

The invention relates to a method for adapting optical properties of an immersion mixture and to immersion mixtures and components thereof.

DESCRIPTION OF RELATED ART

Immersion media for microscopy and the respective effects thereof in the optical system are well known. The use of immersion media, in particular between an objective and a sample container or the sample itself, allows larger numerical apertures to be achieved than would be the case without a suitable immersion medium. Thus, it allows the mostly negative effect of an air gap between the front lens of an objective and the sample container or the sample to be largely eliminated.

The many years of knowledge in this field are summarized in the standard ISO 8036. For example, for type N and type F immersion oils, the refractive index is specified as $ne=1.5180\pm0.0005$ at 23° C. and the dispersion (Abbe number) as $ve=43\pm4$. The refractive index is in this description denoted by ne and is stated for a temperature of 23° C., except where a different reference temperature is expressly stated. A wavelength of 546.1 nm is chosen as reference.

The demands placed by modern microscopy methods on the respective immersion media to be used are very high. Depending on the application, very high refractive indices can be necessary in order to achieve maximal numerical apertures. On the other hand, it may be necessary to suppress or at least reduce optical transitions and imaging errors by adapting the refractive index to the test material (sample).

For example, in live-cell imaging, differences in the refractive index of the cells undergoing examination can cause a reduction in image quality and resolution. Since inclusion agents are not normally used in live-cell imaging, the actual composition of the cell plasma is key for the immersion medium that is to be used.

The refractive index of cells is determined by the concentrations of various salts and by organic constituents in the cell plasma. For example, the refractive indices of biological cells at 23° C. can be within a range between $ne=1.34$ to $1.42$.

Examples of immersion oils in common use to date include:
Immersion oil in accordance with ISO 8036 Immersol® 518 N, Immersol® 518 F, $ne=1.5180$,
Immersion glycerol Immersol® G, $ne=1.4560$,
Silicone oil Immersol® Sil 406, $ne=1.4041$, and
Immersol® W 2010 (corresponds to water), $ne=1.3339$.

SUMMARY OF THE INVENTION

The object of the invention is to propose a possibility and means for adapting the refractive indices of immersion media to current requirements.

The object is achieved by a method, by chemical compounds, by an immersion mixture, and by the use thereof as described below. Advantageous developments are also set out in the embodiments below.

DETAILED DESCRIPTION OF THE INVENTION

The method according to the invention serves to adapt the optical properties of an immersion mixture for example to the current optical properties of a sample undergoing imaging. Examples of such optical properties of the sample include reflection, absorption, and conversion in respect of at least one wavelength of an illuminating radiation. The method comprises the steps of providing an immersion mixture, determining current actual values, comparing the actual values with target values, optionally determining a target mixture ratio, and setting the target mixture ratio.

The provided immersion mixture is composed of a plurality of components, wherein at least two of the components have optical properties different from one another and the immersion mixture possesses optical properties resulting from the respective proportions of the components. The components are preferably miscible with one another (mixtures) or soluble in one another (solution). In further embodiment options of the invention it is possible for at least one of the components to be dispersible in the at least one other component and to form for example micelles (dispersion, suspension). For the purposes of simplification, reference is made in this description to mixtures, even when said mixtures are dispersions, suspensions, and/or solutions. It is important that a particular mixing ratio of the components always results in the same optical properties. Where necessary, the immersion mixture must be subjected to appropriate treatment, for example heated, cooled, stirred, shaken, and/or exposed to radiation, in order to achieve the most homogeneous possible distribution of the components in the immersion mixture. The resulting optical properties of the immersion mixture are advantageously achieved within a temperature range suitable for live cell imaging, for example 5 to 36° C. or 10 to 15° C. or 25 to 36° C. or 30° C. to 36° C. It is advantageous when the changes in the resulting optical properties take place approximately linearly at least over a range of mixing ratios. The immersion mixtures according to the invention are in particular used with refractive indices within a range from $ne=1.35$ up to and including 1.42. Within this range, the use according to the invention of immersion mixtures having at least two components is also advantageous.

The current actual values for the optical properties of the immersion mixture can be determined for example on the basis of an analysis of actual measured values obtained from a detector. For example, an illuminating radiation having a known wavelength and/or intensity can be directed onto the immersion mixture and, in particular, fractions of the illuminating radiation that has passed through a known layer thickness of the immersion mixture can be detected and evaluated. For example, the actual values can be determined before use of the immersion mixture as an immersion medium, by performing the appropriate measurements shortly before use. For example, a media feed line can be provided with a measurement window through which measurement of the immersion mixture takes place. The current mixing ratio of the components of the immersion mixture is recorded and stored at least temporarily, with this logged against the actual values.

These actual values can already be recorded before performance of the method and saved for example in table form. During performance of the method, the actual values can be determined by reading off the table value(s) associated with a currently set mixing ratio of the components in the immersion mixture. The relationship of the actual values with the current mixing ratio and optionally also with a current temperature of the immersion mixture can be determined and stored as table values and/or in the form of a mathematical relationship (function).

The actual values can also, additionally or alternatively, be determined on the basis of the evaluation of image data of the sample or image data of a reference object, for example by relating predetermined parameters of the image data to the actual values and to a particular mixing ratio.

In addition, target values for the immersion mixture are determined. This can be done for example through the use of theoretical models to calculate target values expected for a given sample and for known conditions of the imaging process, such as optical properties of the sample, sample temperature, ambient temperature, wavelength of an illuminating radiation used, the technical parameters of an objective used, and/or technical parameters of a detector used. If the immersion mixture has optical properties having these target values and if the immersion mixture is being used as an immersion medium, it should be possible to achieve a specific—in particular highest possible—quality for the image data of the sample.

The target values for the optical properties of the immersion mixture can be defined for example as a function of at least one determined optical property of a sample undergoing imaging. For example, the refractive index of the immersion mixture can be selected as the target value corresponding to the refractive index of the sample determined as the actual value.

The current actual values are compared with the target values for at least selected optical properties of the immersion mixture, for example the refractive index thereof. This can be done automatically in an evaluation unit, for example a computer, and/or by visual inspection of the values by a user of the method.

If an impermissible difference between the actual values and the target values is found, a target mixing ratio for the components of the immersion mixture is determined at which the target values are achieved. The respective proportions of the components in the immersion mixture are adjusted in accordance with the target mixing ratio, and the thus adapted immersion mixture with its correspondingly modified actual values is used as the immersion medium. Whether a difference is impermissible is determined on the basis of specified tolerance limits or tolerance ranges.

Water may be used as one of the components and a further component used may be a water-soluble inorganic compound, for example a salt. Alternatively or additionally, a water-soluble organic compound may be chosen. It is also possible to choose a water-insoluble compound as one of the components and a solvent suitable for dissolution of the compound as a further component.

A basic concept of the invention is to use the immersion mixture comprising at least two components and to dynamically adapt the composition desired in the individual case, i.e. the mixing ratio of the components, such that the differences in the refractive indices of the immersion mixture and the sample are as small as possible.

Good images of the sample are achieved when the difference in refractive index between the immersion medium and the cell plasma is as small as possible (preferably delta $n_e < 0.01$, better $<0.005$). In order to achieve good image quality for living cells over the entire examination area concerned, the immersion media according to the invention, in particular the immersion mixture, should be adapted by means of regulated mixing, for example on the microscope.

The method according to the invention advantageously allows the refractive index of the immersion mixture to be variably adjusted to the particular sample and also to the currently prevailing ambient conditions such as the temperature of the room and/or of the samples.

The invention makes use of an immersion mixture that is conceived as at least a two-component mixture. In contrast to one-component immersion media, an immersion mixture comprising at least two components having different optical properties, in particular different refractive indices, allows the resulting optical properties of the immersion mixture, in particular a resulting refractive index, to be variably adjusted. Gradient mixing systems are suitable for dynamic adjustment of refractive indices to sample properties and sample temperature.

It is advantageous when the components of the immersion mixture have low vapor pressures in order that stable refractive indices are maintained even during protracted measurements. The viscosity of the components is likewise important. The lower the viscosity, the better the components mix in the corresponding mixing systems. The viscosities of the at least two components should also not be too different, since mixing inhomogeneities can otherwise easily occur.

The refractive index of immersion liquids depends on the current working temperature. In order to achieve high imaging quality, it is therefore advantageous to adjust the refractive index of the immersion mixture in line with the temperature of the particular sample.

Such a relationship for the refractive index of binary liquid mixtures has been described for example by Langhals (Langhals, H. (1985), Z. phys. Chemie 266: 775-780.

The expected refractive index for a two-component mixture can usually be estimated well within a range between $n_e = 1.35$ and $1.42$ and, as a first approximation, shows linear behavior with the ratio of the two fractions by volume and by weight. For fluorinated components, the mostly higher densities (often more than 1.3 $g/cm^3$) mean that this linear relationship applies only to a limited extent and must be modeled mathematically through appropriate nonlinear relationships. The immersion mixtures according to the invention allow refractive indices to be adjusted within a range from $n_e = 1.31$ to $1.51$, in particular from $1.35$ to $1.48$, for example from $1.42$ to $1.48$, as a function of the particular components used and of the mixing ratios thereof.

Examples of possible immersion mixtures and of the components thereof are given below.

The immersion mixtures may be divided into the following groups:
  mixtures of water and inorganic substances (salt solutions),
  mixtures of water and organic compounds,
  mixtures of high-boiling organic compounds that are water-soluble, and
  mixtures of water-insoluble organic compounds.

Combinations of one or more such mixtures are of course also possible in principle here, for example a mixture of water, inorganic substances, and organic compounds. Mixtures of water-soluble, organic compounds and water-insoluble compounds are possible too.

By combining organic components having different chemical structures, it is also possible to vary to some degree the dispersion of an immersion medium, as expressed by the Abbe number ve.

A: Mixtures of Water and Inorganic Substances

Mixtures of water and inorganic substances such as potassium carbonate or sodium citrate can be produced either by mixing a highly concentrated solution of the inorganic substance and water, for example in a mixer system. For example, high-concentration and low-concentration aqueous solutions of the salts can be mixed. It is also possible to add a defined amount of a pure salt in solid form to an aqueous or low-concentration solution and mix this together. The refractive index is determined or measured as an actual value, for example on the basis of theoretical models as a function of the concentration of one or more salts. To suppress colonization of the immersion mixture by fungi, bacteria, and/or algae and to prolong the shelf life, herbicides, algicides and/or bactericides may be added to the immersion mixture. If they have an influence on the resulting optical properties of the immersion mixture, these biocidal additives are also treated as components having different optical properties. A disadvantage of water-containing immersion mixtures is the possible evaporation of water fractions, which, in addition to the change in the refractive index during the measurement, can result in problems due to crystalline deposits. Mention should in particular be made here of the potential for clogging of the pumps and/or of the mixer system and for contamination of the sample space.

Examples of suitable substances for immersions based on aqueous solutions of inorganic substances are:
  ammonium sulfate, molecular weight 132.1 g/mol, solubility in water (20° C.) 754 g/L (Merck), aqueous solution 200 g/L (1.51 mol/L): ne=1.3629;
  sodium benzoate, molecular weight 144.1 g/mol, solubility in water (20° C.) 660 g/L (Merck), aqueous solution 200 g/L (1.39 mol/L): ne=1.3770;
  sodium chloride, molecular weight 58.4 g/mol, solubility in water (20° C.) 358 g/L (Merck), aqueous solution 200 g/L (3.42 mol/L): ne=1.3656;
  sodium salicylate, molecular weight 160.1 g/mol, solubility in water (20° C.) 1000 g/L (Merck), aqueous solution 200 g/L (1.25 mol/L): ne=1.3747;
  sodium thiocyanate (sodium rhodanide), molecular weight 81.1 g/mol, solubility in water (20° C.) 1200 g/L (Merck), aqueous solution 200 g/L (2.47 mol/L): ne=1.3765;
  sodium molybdate dihydrate, molecular weight 241.95 g/mol, solubility in water (20° C.) 840 g/L (Merck), aqueous solution 200 g/L (0.83 mol/L): ne=1.3619;
  sodium tungstate dihydrate, molecular weight 329.9 g/mol, solubility in water (20° C.) 730 g/L (Merck), aqueous solution 200 g/L (0.61 mol/L): ne=1.3531; and
  magnesium sulfate heptahydrate, molecular weight 246.5 g/mol, solubility in water (20° C.) 710 g/L (Merck), aqueous solution 200 g/L (0.81 mol/L): ne=1.3529.

B: Mixtures of Water and Organic Compounds

It is also possible to mix one or more organic compounds with water. It is likewise possible to prepare aqueous solutions (extracts) beforehand and mix them with one another. Alcohols (mono-, di-, and polyfunctional) are particularly suitable as organic compounds, as these usually have good miscibility with water. Examples include: aqueous solutions of ethylene glycol, propylene glycol, polyethylene glycols, polypropylene glycols, butanediols, tetrahydrofurfuryl alcohol, tetrahydrofurfuryl alcohol polyethylene glycol ether (glycofurol), 1,4-cyclohexanedimethanol, glycerol, trimethylolethane, glycol ethers, and polyacetals. Likewise advantageous can be the addition of tertiary amines, amides, polyacrylic acid and copolymers, polyacrylamides, polyvinyl alcohols, sugars and sugar alcohols, and citric acid. Using a suitable mixing unit (mixer system), various aqueous solutions can be used to adjust and mix the immersion mixture to a desired refractive index as the actual value, for example within a range from ne=1.35 to 1.42 inclusive. The formation of deposits is practically impossible here. However, water can continue to evaporate, resulting in fluctuating quality of the image data in protracted measurements if the evaporation losses are not compensated from time to time or continuously. Such compensation of evaporating fractions of the immersion mixture can be achieved through the above-described comparison of actual values and target values or by means of an appropriately controlled mixing unit. An advantage of water-containing immersion mixtures is the easy cleaning of mixing and metering systems by rinsing with water, in particular deionized water.

Examples of suitable substances for water-containing immersions are:
  tetrahydrofurfuryl alcohol polyethylene glycol ether (glycofurol), ne=1.4621;
  ethylene glycol diacetate, ne=1.4161;
  tetraoxaundecane, ne=1.4144;
  diethylacetoacetamide, ne=1.4728;
  2,2'-thiodiethanol, ne=1.5236;
  triethanolamine, ne=1.4868;
  polypropylene glycol 400, ne=1.4480;
  dipropylene glycol, ne=1.4417;
  diethylene glycol diethyl ether, ne=1.4126; and
  dimethyl propylene urea, ne=1.4909.

C: Mixtures of High-Boiling Organic Substances that are Water-Soluble

In a further embodiment of the invention it is possible for the abovementioned compounds to be used directly as pure substances. In this case, two water-soluble pure substances are used in an immersion mixture and this is used as an immersion medium. Here too, it is again possible to adjust the refractive index of the immersion mixture. The advantage of this approach is that no deposits form here and, because of the high-boiling nature of the immersion components, there are no adverse evaporation effects. In addition, the immersion mixture can be easily removed with water. However, measurements in conditions of high atmospheric humidity can lead to the absorption of water by the immersion mixture, as a result of which the refractive index may change during the measurement. In addition to the compounds mentioned, glycol-terminated short-chain perfluoropolyethers are also suitable here, particularly in the form of a mixture with alcohols, diols, polyols or glycol ethers.

Examples of substances (fluorine-free) that are suitable for live-cell immersions (non-aqueous) are:
  methylphenyl acetate; ne(23)=1.5092;
  diethyl maleate; ne(23)=1.4414;
  diethyl fumarate; ne(23)=1.4419;
  dimethyl maleate; ne(23)=1.4435,
  bis (2-ethylhexyl) sebacate; ne(23)=1.4511,
  diethyl succinate; ne(23)=1.4200;
  dimethyl adipate; ne(23)=1.4289;
  triethylene glycol bis(2-ethylhexanoate); ne(23)=1.4449;

triethyl citrate; ne(23)=1.4431;
di-n-butyl carbonate;
malondialdehyde bis(dimethyl acetal); ne(23)=1.4070;
2-ethylhexane-1,3-diol; ne(23)=1.4518;
diacetone alcohol (4-hydroxy-4-methyl-2-pentanone); ne(23)=1.4244;
2-ethylhexyl phosphate, mixture of mono- and diesters; ne(23)=1.4437; and
diethylacetamide; ne(23)=1.4408.

D: Mixtures of Water-Insoluble Organic Compounds

High-boiling, water-insoluble compounds may likewise be used in multi-component immersion mixtures that are mixed directly in situ. Functional fluorinated organic compounds are particularly suitable here, since, in addition to a very low refractive index, they also have very high dispersion. This means that admixing of just small amounts may be sufficient to achieve large optical effects in respect of refractive index and dispersion. The chemical modification of organofluorine compounds having functional end or side groups such as glycol, alkyl ether, carboxyl, ester, vinyl, allyl, acryloyl/methacryloyl or alkyl makes it possible to mix these with non-fluorinated substances. Pure perfluoro compounds are, on the other hand, absolutely incompatible with other organic substances. In addition, these modifications can at the same time serve to adapt the refractive index. For example, the refractive index is increased by esterification with aromatic carboxylic acids, whereas the dispersion decreases. By mixing a plurality of organofluorine and/or aliphatic, cycloaliphatic esters and ethers, the resulting refractive index of the immersion mixture can likewise be adapted to the application in situ.

In one embodiment of the immersion mixture according to the invention, the water-insoluble compound is an ethoxylated perfluoropolyether having terminal dialcohols or a 2,3,3,3-tetrafluoro-2-[1,1,2,3,3,3-hexafluoro-2-(heptafluoropropoxy)propoxy]-1-propanol.

Examples of such fluorine compounds are:
Fluorolink® E10-H* (bifunctional glycol-terminated perfluoropolyether), molecular weight approx. 1500 g/mol, ne=1.3180;
Fluorolink® D10* (alcohol-terminated perfluoropolyether);
Fluorolink® L10* (perfluoropolyether dicarboxylic acid dimethyl ester);
Cheminox FA-6; 2-(perfluorohexyl)-ethanol;
Cheminox PO-3-ME; methyl 2,3,3,3-tetrafluoro-2-[1,1,2,3,3,3-hexafluoro-2-(heptafluoropropyl)-propoxy] propanoate;
Cheminox PO-3-OH; 2,3,3,3-tetrafluoro-2-[1,1,2,3,3,3-hexafluoro-2-(1,1,2,3,3,3-heptafluoropropoxy) propoxy]-1-propanol, ne=1.2944; and
Cheminox OXF-3PO-OH; bis(hydroxymethyl)perfluoropolyether, MW=536 g/mol, ne=1.3220.

Fluorolink® E10-H is a perfluoropolyether of the formula

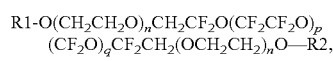

Chominox PO-3-OH is a compound having the structural formula:

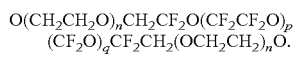
or
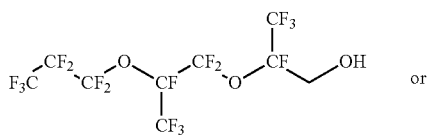

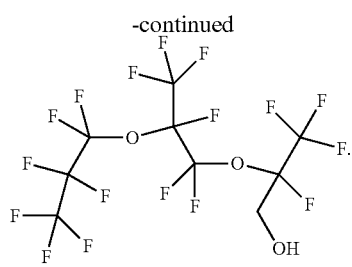

The above structural formula is shown in two modes of representation.

Cheminox PO-3-OH is also known in the chemical nomenclature as 2,3,3,3-tetrafluoro-2-[1,1,2,3,3,3-hexafluoro-2-(heptafluoropropoxy)propoxy]-1-propanol (product list; HFPO derivatives; Unimatec).

In the course of this invention, new chemical compounds have been found, synthesized, and used as components in immersion mixtures of the invention.

One of these new chemical compounds is an esterified perfluoropolyether of the chemical structure R1-O(CH$_2$CH$_2$O)$_n$CH$_2$CF$_2$O(CF$_2$CF$_2$O)$_p$
(CF$_2$O)$_q$CF$_2$CH$_2$(OCH$_2$CH$_2$)$_n$O—R2, where the groups R1 and R2 are each either
phenylacetate ester,
tetrahydrofurancarboxylate ester or
(2-methoxyethoxy)acetate ester In these structures, n=1-3. The indices p and q are each within a range from 3 to 12. The advantageous effect of the groups R1 and R2 consists inter alia of a lowering of the refractive index (v value) due to the cyclic structures at the ends (phenylacetate ester and tetrahydrofurancarboxylate ester) and also that of a solubilizer (especially (2-methoxyethoxy)acetate ester) for the generally sparingly soluble fluorinated compounds.

Examples of these esterified perfluoropolyethers are:
Fluorolink E10 bis(phenylacetate ester); ne=1.3697;
Fluorolink E10 bis(tetrahydrofurancarboxylate ester); ne=1.3480; and
Fluorolink E10 bis[(2-methoxyethoxy)acetate ester]; ne=1.3461.

The synthesis of the compound Fluorolink E10 bis(phenylacetate ester) can in one embodiment be carried out via a free acid. This is done by dissolving 150 g of Fluorolink E10 (0.1 mol) together with 2.2 equivalents of phenylacetic acid, with heating, in 100 ml of methyl isobutyl ketone and adding 0.95 g of para-toluenesulfonic acid. 3.6 ml of water of reaction collects in the water separator within 3 h (quant.). The reaction solution is washed with three 50 ml portions of water, then with one 50 ml portion of 10% K$_2$CO$_3$ solution, and finally with two more 50 ml portions of water (pH 7-8). The solvent is removed and the ester is obtained.

The compound Fluorolink E10 bis(phenylacetate ester) can in a further embodiment be synthesized via an acid chloride. This is done by dissolving 150 g of Fluorolink E10 together with 25 g of N-methylpiperidine, with heating, in 100 ml of methyl isobutyl ketone followed by dropwise addition of 2.4 equivalents of phenylacetyl chloride. After one hour under reflux, the reaction is complete. The reaction solution is washed with three 50 ml portions of water. The solvent is removed and the ester is obtained.

The compounds Fluorolink E10 bis(tetrahydrofurancarboxylate ester) and Fluorolink E10 bis[(2-methoxyethoxy) acetate ester] can be synthesized via a free acid.

300 g of Fluorolink E10 (0.2 mol) is dissolved together with either 2.2 equivalents of tetrahydrofuran-2-carboxylic acid or 2.2 equivalents of 2-(2-methoxyethoxy)acetic acid, with heating, in 200 ml of methyl isobutyl ketone and 2 g of para-toluenesulfonic acid is added. 7.2 ml of water of reaction collects in the water separator within 3 h (quant.). The reaction solution is washed with four 50 ml portions of water. The solvent is removed and the ester is obtained after filtration through activated charcoal.

Another new chemical compound has the following chemical structure:

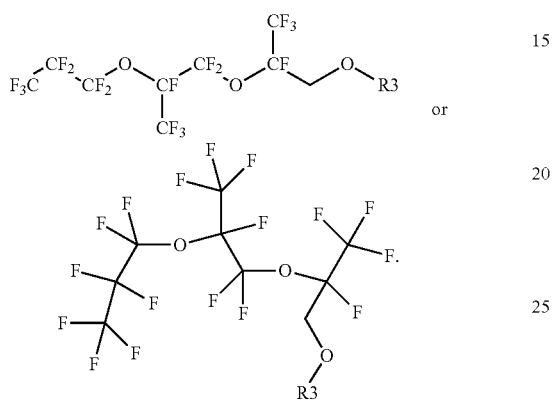

The above structural formula is shown in two modes of representation. The group R3 is a phenylacetate ester (radical).

An example of such a chemical compound is Cheminox PO-3-OH phenylacetate ester; ne=1.3551.

The compound Cheminox PO-3-OH phenylacetate ester can be synthesized via a free acid. This is done by dissolving Cheminox PO-3-OH together with 2.2 equivalents of phenylacetic acid, with heating, in toluene and adding para-toluenesulfonic acid. Water of reaction collects in the water separator (quant.). The reaction solution is washed with several portions of water. The solvent is removed and the ester is obtained.

Listed below are application examples for immersion mixtures that are particularly suitable for use as immersion media in live-cell imaging.

i) Examples for aqueous immersion mixtures IM 1/1 to IM 1/10 are (parts by wt.=parts by weight):

IM 1/1: 66.75 parts by wt. water,
  33.75 parts by wt. glycofurol,
  ne=1.3800,
  Dispersion ve=55.1,
  Viscosity (23° C.)=3.21 mm$^2$/s,
  Surface tension against air (20° C.): 42.3 mN/m;
IM 1/2: 74.8 parts by wt. water,
  25.2 parts by wt. polypropylene glycol 400,
  ne=1.3700,
  Dispersion ve=52.9,
  Viscosity (23° C.)=3.6 mm$^2$/s;
IM 1/3: 67.5 parts by wt. water,
  32.5 parts by wt. polypropylene glycol 400,
  0.1 parts by wt. p-chloro-m-cresol (Preventol CMK), biocide,
  ne=1.3800,
  Dispersion ve=55.1,
  Viscosity (23° C.)=5.3 mm$^2$/s;
IM 1/4: 65.9 parts by wt. water,
  25.6 parts by wt. diethylacetoacetamide,
  8.5 parts by wt. tetraoxaundecane,
  ne=1.3800,
  Dispersion ve=50.7,
  Viscosity (23° C.)=2.7 mm$^2$/s;
IM 1/5: 80.85 parts by wt. water,
  19.15 parts by wt. glycofurol,
  ne=1.3600,
  Dispersion ve=55.4,
  Viscosity (23° C.)=1.86 mm$^2$/s,
  Surface tension against air (20° C.): 40.2 mN/m;
IM 1/6: 75.2 parts by wt. water,
  24.8 parts by wt. dipropylene glycol,
  ne=1.3650,
  Dispersion ve=57.9,
  Viscosity (23° C.)=2.5 mm$^2$/s,
  Surface tension against air (20° C.): 46.6 mN/m;
IM 1/7: 77.85 parts by wt. water,
  22.15 parts by wt. polypropylene glycol 400,
  ne=1.3650,
  Dispersion ve=55.3,
  Viscosity (23° C.)=3.0 mm$^2$/s,
  Surface tension against air (20° C.): 39.5 mN/m;
IM 1/8: 81.5 parts by wt. water,
  18.5 parts by wt. 2,2'-thiodiethanol,
  ne=1.3650,
  Dispersion ve=52.1,
  Viscosity (23° C.)=1.7 mm$^2$/s,
  Surface tension against air (20° C.): 52.4 mN/m;
IM 1/9: 73.8 parts by wt. water,
  26.2 parts by wt. diethylene glycol diethyl ether,
  ne=1.3650,
  Dispersion ve=55.3,
  Viscosity (23° C.)=2.6 mm$^2$/s,
  Surface tension against air (20° C.): 35.95 mN/m;
IM 1/10: 80.9 parts by wt. water,
  19.1 parts by wt. N,N'-dimethylpropyleneurea,
  ne=1.3650,
  Dispersion ve=50.7,
  Viscosity (23° C.)=1.9 mm$^2$/s,
  Surface tension against air (20° C.): 45.5 mN/m.

ii) Examples for anhydrous immersion mixtures IM 2/1 to IM 2/4 are:

IM 2/1: 70.65 parts by wt. Fluorolink E10 H,
  29.35 parts by wt. diethylacetoacetamide,
  ne=1.3800,
  Dispersion ve=52.8,
  Viscosity (23° C.)=45 mm$^2$/s;
IM 2/2: 69.55 parts by wt. malondialdehyde bis(dimethylacetal),
  30.45 parts by wt. Cheminox PO-3-OH,
  ne=1.3800,
  Dispersion ve=65.5,
  Viscosity (23° C.)=2.0 mm$^2$/s;
IM 2/3: 48.8 parts by wt. diethyl fumarate,
  51.2 parts by wt. Cheminox PO-3-OH,
  ne=1.3800,
  Dispersion ve=47.5,
  Viscosity (23° C.)=3.0 mm$^2$/s;
IM 2/4: 66.6 parts by wt. Cheminox OXF-3PO-OH,
  34.4 parts by wt. dimethyl adipate,
  ne=1.3650,
  Dispersion ve=71.6,
  Viscosity (23° C.)=9.6 mm$^2$/s.

iii) Examples for immersion mixtures IM 3/1 to IM 3/4 comprising water and at least one inorganic component (salt solutions) are:

IM 3/1: Magnesium sulfate heptahydrate solution in water,
345 g/L or 302 g/kg,
ne=1.3650,
Dispersion ve=57.9;

IM 3/2: Sodium chloride solution in water,
194 g/L or 178 g/kg,
ne=1.3650,
Dispersion ve=52.1;

IM 3/3: Ammonium sulfate solution in water,
175 g/L or 165 g/kg,
ne=1.3600,
Dispersion ve=57.1;

IM 3/4: Sodium benzoate solution in water,
190 g/L or 181 g/kg,
ne=1.3750,
Dispersion ve=47.5.

All of the abovementioned examples of the immersion mixture according to the invention advantageously contain the respective compounds in a proportion of at least 30 percent by weight (parts by wt.=wt %) in addition to the water, where present.

The invention claimed is:

1. An immersion mixture, comprising:
a plurality of components, wherein at least two of the components have optical refractive powers different from one another, and the immersion mixture possesses an optical refractive power resulting from the respective proportions of the components,
wherein one of the components is a water-insoluble compound and a further component is a solvent suitable for dissolution or mixing of the water-insoluble compound,
wherein the water-insoluble compound is a fluorinated organic compound,
wherein the solvent suitable for dissolution or mixing of the water-insoluble compound comprises diethylacetoacetamide or malondialdehyde bis(dimethylacetal).

2. The immersion mixture as claimed in claim 1, wherein the water-insoluble compound is an ethoxylated perfluoropolyether having terminal dialcohols or a 2,3,3,3-tetrafluoro-2-[1,1,2,3,3,3-hexafluoro-2-(heptafluoropropoxy)propoxy]-1-propanol.

3. The immersion mixture as claimed in claim 2, wherein the water-insoluble compound is an ethoxylated perfluoropolyether having terminal dialcohols.

4. The immersion mixture as claimed in claim 2, wherein the water-insoluble compound is 2,3,3,3-tetrafluoro-2-[1,1,2,3,3,3-hexafluoro-2-(heptafluoropropoxy)propoxy]-1-propanol.

5. The immersion mixture as claimed in claim 1, wherein the water-insoluble compound is an esterified perfluoropolyether of the chemical structure R1-O(CH$_2$CH$_2$O)$_n$CH$_2$CF$_2$O(CF$_2$CF$_2$O)$_p$(CF$_2$O)$_q$CF$_2$CH$_2$(OCH$_2$CH$_2$)$_n$O—R2 wherein the groups R1 and R2 are each either phenylacetate ester, tetrahydrofurancarboxylate ester, or (2-methoxyethoxy)acetate ester;
n=1 to 3; and
p and q are each chosen from within a range from 3 to 12.

6. The immersion mixture as claimed in claim 5, wherein the groups R1 and R2 are each phenylacetate ester.

7. The immersion mixture as claimed in claim 5, wherein the groups R1 and R2 are each tetrahydrofurancarboxylate ester.

8. The immersion mixture as claimed in claim 5, wherein the groups R1 and R2 are each (2-methoxyethoxy)acetate ester.

9. The immersion mixture as claimed in claim 1, wherein the proportion of the water-insoluble compounds is at least 30 percent by weight.

10. The immersion mixture as claimed in claim 1, wherein the water-insoluble compound is a compound of the chemical structure

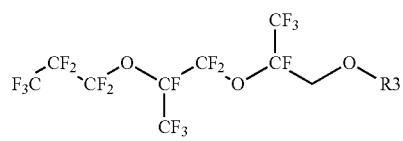

wherein the group R3 is a phenylacetate ester (radical).

11. The immersion mixture as claimed in claim 1, wherein the solvent suitable for dissolution or mixing of the water-insoluble compound comprises diethylacetoacetamide.

12. The immersion mixture as claimed in claim 1, wherein the solvent suitable for dissolution or mixing of the water-insoluble compound comprises malondialdehyde bis(dimethylacetal).

13. The immersion mixture as claimed in claim 1, wherein the fluorinated organic compound is a functional fluorinated organic compound.

14. An immersion mixture, comprising:
a plurality of components, wherein at least two of the components have optical refractive powers different from one another, and the immersion mixture possesses an optical refractive power resulting from the respective proportions of the components,
wherein one of the components is a water-insoluble compound and a further component is a solvent suitable for dissolution or mixing of the water-insoluble compound,
wherein the water-insoluble compound is a fluorinated organic compound,
wherein the solvent suitable for dissolution or mixing of the water-insoluble compound comprises diethylacetoacetamide, malondialdehyde bis (dimethylacetal), or diethyl fumarate,
wherein the water-insoluble compound is an ethoxylated perfluoropolyether having terminal dialcohols or a 2,3,3,3-tetrafluoro-2-[1,1,2,3,3,3-hexafluoro-2-(heptafluoropropoxy)propoxy]-1-propanol.

15. The immersion mixture as claimed in claim 14, wherein the solvent suitable for dissolution or mixing of the water-insoluble compound comprises diethyl fumarate.

16. A method of microscopy, the method comprising:
preparing the immersion mixture as claimed in claim 1 as an immersion medium.

17. A method for adapting optical properties of an immersion mixture, the method comprising:
providing an immersion mixture according to claim 6,
determining current actual values for the optical properties of the immersion mixture, comparing the current actual values with target values for optical properties of the immersion mixture, determining a target mixing ratio for the components of the immersion mixture where there is an impermissible difference between the actual values and the target values, wherein the target mixing ratio achieves the target values, and adjusting the respective proportions of the components in the immersion mixture in accordance with the target mixing ratio.

18. The method as claimed in claim 1, wherein the target values for the optical properties of the immersion mixture can be defined as a function of at least one determined optical property of a sample undergoing imaging.

19. The method as claimed in claim 17, wherein the water-insoluble compound is an esterified perfluoropolyether of the chemical structure

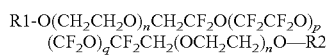

R1-O(CH$_2$CH$_2$O)$_n$CH$_2$CF$_2$O(CF$_2$CF$_2$O)$_p$(CF$_2$O)$_q$CF$_2$CH$_2$(OCH$_2$CH$_2$)$_n$O—R2 wherein
the groups R1 and R2 are each either
phenylacetate ester,
tetrahydrofurancarboxylate ester, or
(2-methoxyethoxy)acetate ester;
n=1 to 3; and
p and q are each chosen from within a range from 3 to 12.

20. The method as claimed in claim 7, wherein the water-insoluble compound is a compound of the chemical structure

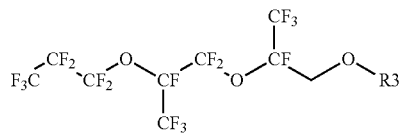

wherein
the group R3 is a phenylacetate ester (radical).

* * * * *